Nov. 27, 1962

B. KIRSTEN 3,065,729

COMBINED KNOB AND DIAL

Filed May 22, 1961

INVENTOR.
BERNDT KIRSTEN

United States Patent Office 3,065,729
Patented Nov. 27, 1962

3,065,729
COMBINED KNOB AND DIAL
Berndt Kirsten, 606 N. Gardner St.,
Los Angeles 3, Calif.
Filed May 22, 1961, Ser. No. 103,270
3 Claims. (Cl. 116—124)

This invention relates to tuning knobs for indicating and controlling electronic and mechanical instruments and components and more particularly to front face knobs which are integral with and contain the dial and indicator therefore.

Means for illuminating the dial and indicator to provide maximum readability is also provided, thus eliminating the use of expensive internally illuminated panels. This invention relates to improvements in tuning knobs of the type disclosed in my United States Patent 2,819,-698 entitled "Combined Knob and Dial." Several features of the present invention can be advantageously used on knobs disclosed in the hereinabove mentioned application.

It is often required that the angular excursion of a knob not exceed certain prescribed limits. This requirement is often imposed on knobs which are used to tune certain types of potentiometers, variable capacitors or other electronic circuit components.

It is therefore an object of the present invention to provide a front face combined knob and dial which includes therein a dial and pointer for easy vision and sensitive tuning.

Another object of the present invention is to provide a combined knob and dial which encloses an integral dial thus protecting the latter from the ambient.

A further object of the present invention is to conserve space on an instrument panel by providing an improved type knob and dial combination.

A still further object of the present invention is to provide a dial and knob combination of novel construction which limits the angular rotation of a shaft to which it is connected within a predetermined or adjustable range.

According to the presently preferred embodiment of this invention there is provided a knob enclosing an indicia bearing dial over which an indicator or pointer may play to indicate the position of a shaft which may be fixedly inserted within the knob.

The novel features which are believed to be characteristic of the invention, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Figure 1:
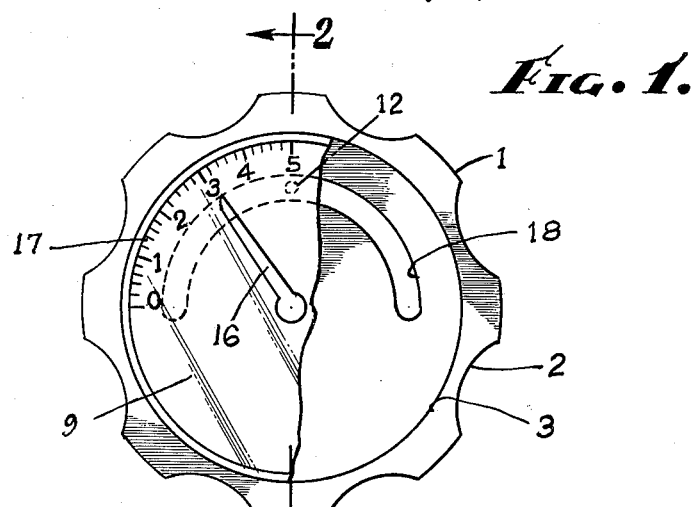
FIGURE 1 is a front elevation, partly broken away showing the structure of a combined knob and dial in accordance with the present invention.
Figure 2:
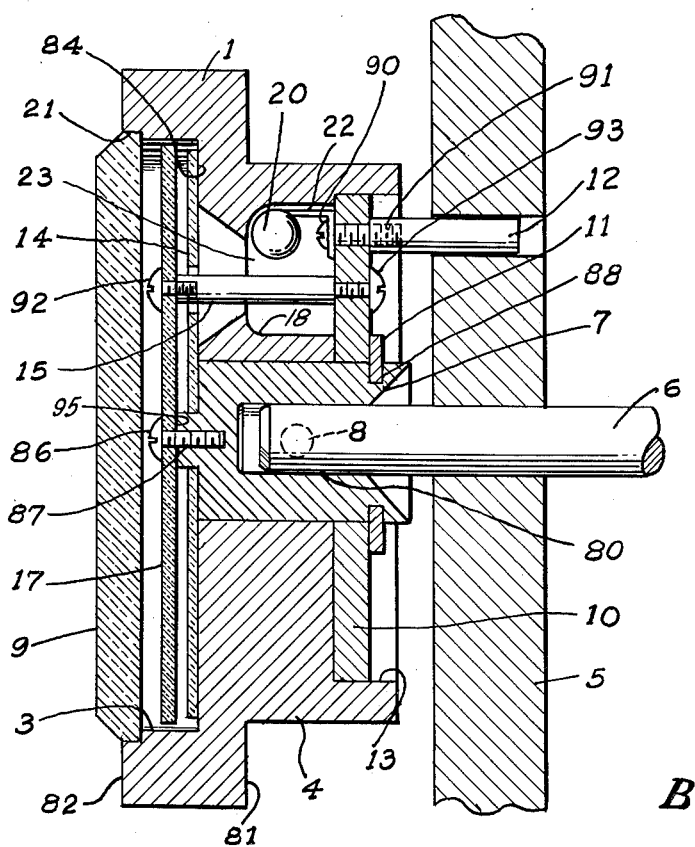
FIGURE 2 is an enlarged sectional view taken along line 2—2 of FIGURE 1.

Referring now to the drawing and particularly to FIGURES 1 and 2, there is shown a manually rotatable knob 1 which may be made of metal or plastic or any other suitable material. In FIGURE 2 the knob 1 is shown to be mounted upon an instrument panel 5 behind which the element, not shown, to be controlled, may be housed. The knob 1 is coupled to the element by shaft 6 which is secured within a circular opening 80 in the center of bearing 7 by means of set screw 8. In order to facilitate manual rotation, the peripheral surface of knob 1 may be formed with spaced flutes of corrugations 2 as shown in FIGURE 1.

The knob 1 further has a cylindrical body portion 4 which may preferably be stepped down at shoulder 81 if desired to produce a larger viewing front. The outer facing wall 82 of the knob has a circular recess 3 therein to accommodate dial 17, conductor plate 14 and transparent cover member 9. Member 9 is press fitted within shoulder 21 to form a tight seal to keep the dial element within the knob free of dust and other elements in the ambient such as moisture and the like.

Dial 17, which may be a painted or engraved transparent plate, is supported by the front surface of bearing 7 and held against the same by screw 86 which is threaded into hole 87 within bearing 7. Back plate 10 is disposed within back recess 13 of knob 1 forming a support for bearing 7 which may be made of metal or plastic. The back plate 10 is secured against bearing 7 by means of snap ring 11 which is disposed within annular groove 88 in the rear of bearing 7. A conductor plate 14 which rests against surface 84 is provided to uniformly distribute the light from lamp 20 around the dial. The light from lamp 20 is transmitted through opening 23 to conductor plate 14. Said plate 14 may be formed of any light conductive material such as plastic or the like.

In order to fix the angular position of the dial 17 one or more pins 12 are provided which extend through back plate 10 beyond the rear of the body portion 4 of knob 1. Pin 12 is secured to back plate 10 by screws 90 which is connected at hole 91 within pin 12.

The initial angular position of dial 17 is fixedly determined by the initial position of back plate 10 to which dial 17 is directly coupled by means of pin 15. Pin 15 is secured to back plate 10 by means of threaded screw 93 while dial 17 is connected to the opposite end of pin 15 by means of threaded screw 92. A slot 18 which is at a predetermined radius from the center of the knob determines the various possible excursion of the knob and hence of shaft 6 to which it may be coupled. The central angle of slot 18 may, of course, be varied within the range from a few degrees to a maximum of 300° (some material must be left within body portion 4 of the knob so that a continuation thereof will exist).

A pointer or indicator 16 is attached to the inner face of transparent window 9 as shown in FIGURE 1. Pointer 16 may be etched within window 9 by various suitable means, however the pointer or indicator could be placed on the front face of the knob, eliminating the window.

Thus, it is apparent that, in operation, when knob 1 is rotated by manual gripping of the flutes 2 if a shaft 6 is secured thereto, it will likewise rotate as they may be coupled by set screw 8. Back plate 10 will remain in the same angular position established when pin 12 was inserted within the hole provided in instrument panel 5. Thus, dial 17 being coupled to back plate 10, will likewise remain in a fixed angular position. With pointer 16 rotating with knob 1 an indication will be given of the rotation of the knob and such rotation will not be permitted to exceed the limits of the arc of slot 18.

An incandescent lamp 20 directing light toward the conductor plate 14 and through the same to illuminate the dial may be mounted within hollowed out section 23 in section 4 of knob 1. The lamp may be supported by bracket 22 which is mounted against the front surface of back plate 10 by means of screw 90.

Thus there has been described a new and improved knob and dial assembly which may be adapted to control a turnable device within a prescribed angular range in which the knob and dial are integral, the dial being disposed within the knob.

I claim:

1. In a combined knob and translucent dial assembly for controlling a shaft of an adjustable element attached to a supporting structure, said assembly comprising: a rotatable knob defining a central bore for receiving said shaft; means for mounting said knob and said central bore to said shaft to transmit rotation thereto; said knob forming one portion thereof open at the forward end, and another portion thereof open at the rear end whereby said translucent dial concentrically disposed forwardly within said knob and whereby a back plate in sliding engagement closing said opening, means connecting said back plate with said translucent dial, and means for rigidly attaching said back plate to said supporting structure to hold said translucent dial stationary, and an indicator secured to said knob for play over the indicia on said translucent dial when said knob and said indicator is rotated.

2. In a combined knob and translucent dial assembly as defined in claim 1 wherein said connecting means includes a slot; said slot may be varied to extent from a few degrees to a maximum of 300 degrees allowing said knob to move in predetermined excursions.

3. In a combined knob and dial assembly for controlling a shaft of an adjustable device mounted on a supporting structure, said assembly comprising: a knob defining a central bore receiving said shaft; means for mounting said knob to said shaft to transmit rotation thereto, a forward end; a translucent dial element within said forward end of said knob; a conductor plate behind said dial element and means disposed in back of said conductor plate, constituting a source of light, whereby said light therefrom may pass through said conductor plate to distribute light to illuminate said translucent dial element, said knob having an opening at the rear end, a back plate coaxially freely mounted to said rear end closing said opening, and means within said knob for holding said translucent dial element and said back plate in fixed relation, allowing said knob to rotate freely within predetermined limits, said supporting structure providing an opening for stationary supporting said back plate to hold said dial element stationary when said knob is rotated.

References Cited in the file of this patent

UNITED STATES PATENTS

| | | |
|---|---|---|
| Re. 24,999 | Kirsten | June 20, 1961 |
| 2,987,032 | Kirsten | June 6, 1961 |